April 3, 1928.
J. H. POWERS
TRAFFIC SIGNAL FOR AUTOMOBILES
Filed March 6, 1925 2 Sheets-Sheet 1
1,664,791
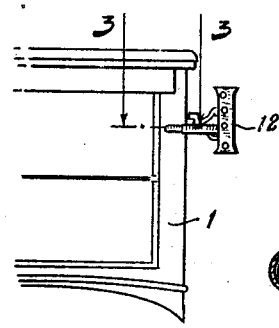
Fig. 11.
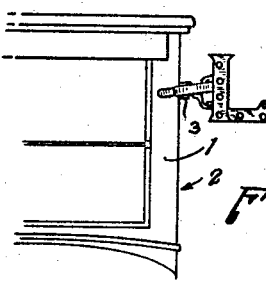
Fig. 12.
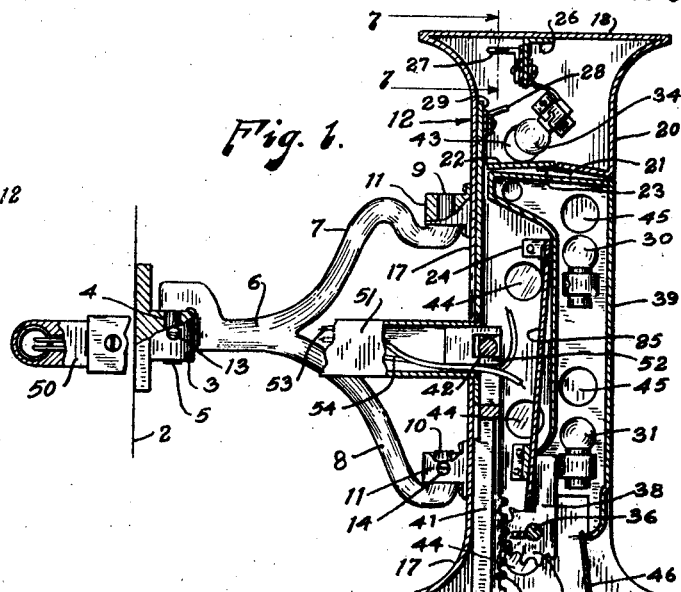
Fig. 1.
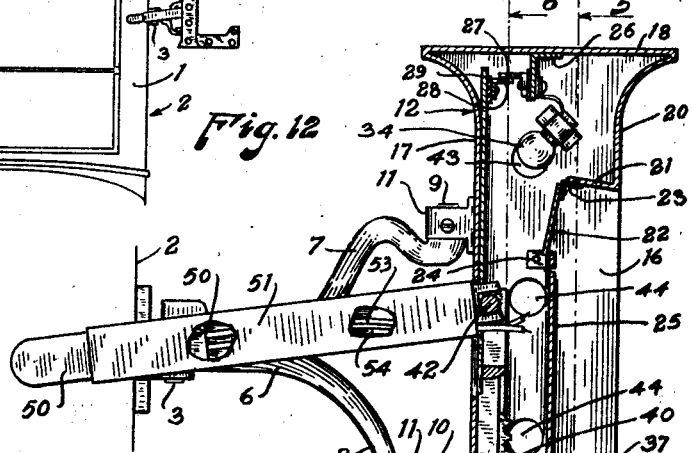
Fig. 2.
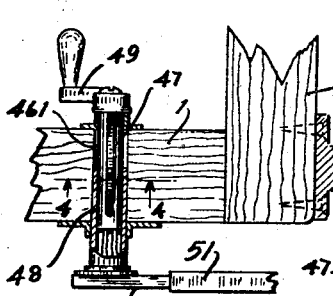
Fig. 3.
Fig. 4.
Inventor
Joseph H. Powers.
By H. J. O'Brien
Attorney April 3, 1928.  J. H. POWERS  1,664,791
TRAFFIC SIGNAL FOR AUTOMOBILES
Filed March 6, 1925    2 Sheets-Sheet 2
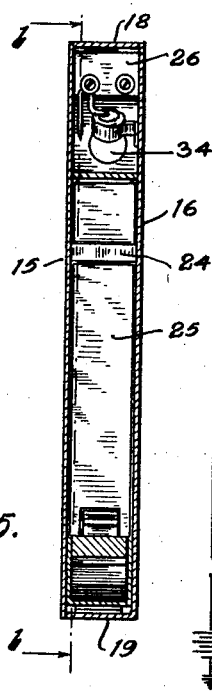
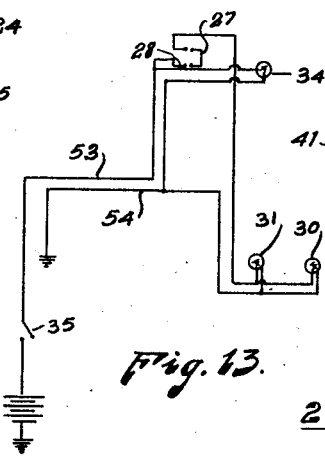
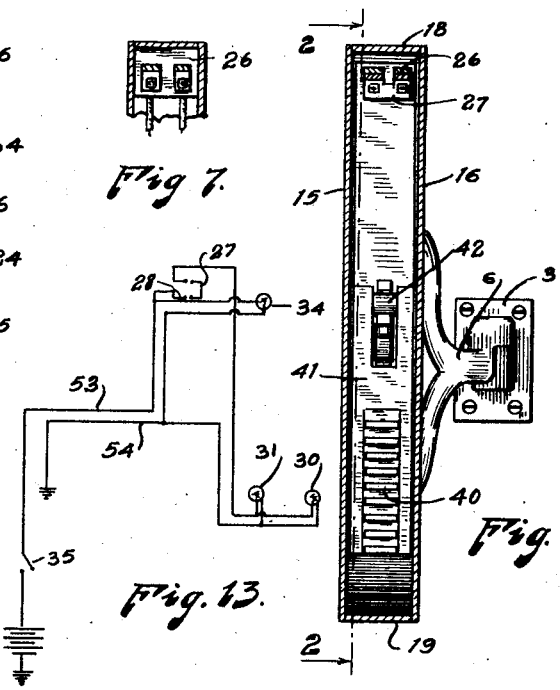
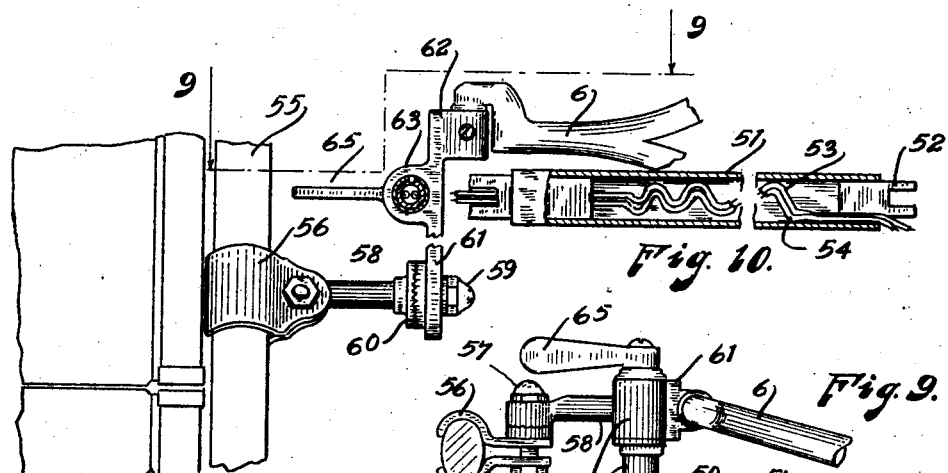
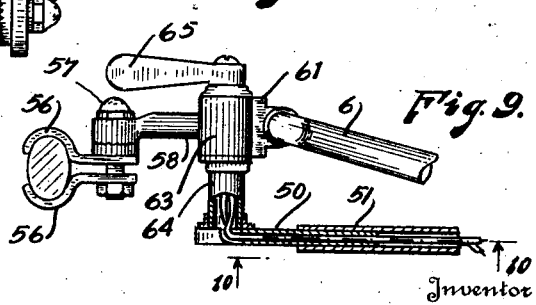
Inventor
Joseph H. Powers.
By H. J. O'Brien
Attorney Patented Apr. 3, 1928.

1,664,791

UNITED STATES PATENT OFFICE.

JOSEPH H. POWERS, OF MILLS, WYOMING.

TRAFFIC SIGNAL FOR AUTOMOBILES.

Application filed March 6, 1925. Serial No. 13,439.

This invention relates to improvements in traffic signals for automobiles.

The density of the automobile traffic on our streets and highways has increased to such an extent that it has become quite essential that every automobile shall be equipped with a signal device by means of which the driver of an automobile can indicate his intention to make a left turn. A turn to the right, when properly executed, does not require a signal to be displayed as no one can be injured by such a turn, unless it should be a pedestrian. The driver must, however, use great care to avoid injuring pedestrians and a signal would very seldom prevent such accidents. My invention has therefore been designed, primarily, with the idea in view of affording an effective and ready means for signaling a left turn.

On country roads and highways where automobiles travel at high speeds a signal to be effective for the purpose of warning the driver of an approaching car must be of sufficient size to be readily distinguished from a considerable distance. I have, therefore, made my signal of considerable size so that it can be seen for a long distance. In order that the significance of the signal shall be more readily apparent to an approaching driver, I have constructed it in such a manner that when it is seen from the front it has the appearance of a capital letter L which indicates a left turn.

It is a further object of this invention to produce a signal that can be readily operated and which shall be provided with lamps that will be illuminated, when the signal is in operative position and which serve to make it readily visible at night.

The above and other objects that will become apparent as the description proceeds are attained by means of a construction that I will now proceed to describe in detail, reference for this purpose being had to the accompanying drawings in which my invention is illustrated and in which Fig. 1 is a vertical sectional view of the signal when in closed or inoperative position, said view being taken on line 1—1 Fig. 5.

Fig. 2 is a view similar to the view shown in Fig. 1 and shows the signal in open or operative position; this section is taken on line 2—2 Fig. 6.

Fig. 3 is a section taken on line 3—3 Fig. 11 and shows the means employed for operating the signal from the inside of a closed car.

Fig. 4 is a section taken on line 4—4 Fig. 3.

Fig. 5 is a section taken on line 5—5 Fig. 2.

Fig. 6 is a section taken on line 6—6 Fig. 2.

Fig. 7 is a section taken on line 7—7 Fig. 1.

Fig. 8 is a front elevation of the means employed for supporting my signal from the windshield frame of an open car.

Fig. 9 is a top plan view of the parts shown in Fig. 8, said view being taken along line 9—9 Fig. 8, the outer lever arm being shown in section.

Fig. 10 is a section taken along line 10—10 Fig. 9.

Fig. 11 is a view showing the left front of an automobile to which my improved signal has been attached; the signal being shown in inoperative position.

Fig. 12 is a view similar to that shown in Fig. 11 showing the signal in operative position. And Fig. 13 is a diagram showing the wiring for the lights.

Numeral 1 designates the left hand corner post of an automobile car body and 2 the left side of the front corner. Secured to the side 2 is a bracket 3. This bracket has an opening 4 for the reception of the pin 5 that projects downwardly from the end of the adjustable bracket 6. The bracket 6 has two arms 7 and 8 with upstanding cylindrical projections 9 and 10 which cooperate with the brackets 11, to which the signal 12 is attached. A set screw 13 in bracket 3 and similar set screws 14 in brackets 11 serve to clamp the members rigidly in adjusted position. The signal, which I have designated in its entirety by numeral 12, when seen from the front has the appearance of a capital letter L, when in operative position, (Figs. 2 and 12), and when it is in inoperative position, it has the appearance shown in Figs. 1 and 11. The signal consists of a boxlike member having sides connected along one edge by the member 17, the upper and lower ends being closed by the end members 18 and 19 respectively. The side opposite from member 17 is open except for a member 20 that extends downwardly a short distance. This member has its lower end 21 bent inwardly and has a member 22 connected to it by means of hinges 23. A bracket 24 secured at each end to one of the sides 15 and 16 supports the downwardly extending partition member 25. An angle 26 is secured to the underside of the top member 18 and supports the switch contact 27 which cooperates with terminals 28 on the slide 29 for the purpose of opening and closing the electrical circuit that controls the lamps 30 and 31. The lamp 34 is controlled by the switch 35 only. The wiring connections have not been shown in Figs. 1, 2, 5 and 6, as this would be confusing, but have been shown in Fig. 13. Mounted so as to rotate about the shaft 36 is a mutilated pinion 37 having an arm 38 to which the hollow signal arm 39 is attached. This arm when viewed invertical longitudinal section (Fig. 2) has the appearance of the lower part of the letter L and when it is in operative position (Figs. 2 and 12) the signal has the appearance of this letter. For the purpose of swinging the arm 39 from inoperative position (Fig. 1) to operative position (Fig. 2) and back again at will, I have provided the following mechanism: A rack 40 is secured to one side of a bar 41 whose upper end is slotted and provided with a pin 42. The slide 29 is secured to the bar 41 so as to be reciprocated thereby. The rack 40 engages the pinion 37 and causes the latter to rotate about its pivot. When the rack 40 is in its lowermost position (Fig. 1) the arm 39 is in inoperative position and the switch contacts 27 and 28 are disconnected. When the rack is moved to its uppermost position, the arm 39 is moved to horizontal or operative position and switch contacts 27 and 28 are electrically connected so as to light the lamps 30 and 31.

At this point I desire to call attention to the fact that the member 22 is moved to the position shown in Fig. 1 when the signal is inoperative; this forms a closed compartment for the lamp 34 whose light can escape only through the opening 43. When member 39 occupies the position shown in Fig. 2, member 22 hangs in a downwardly inclined position with its lower end resting upon the transverse bracket 24, to which member 25 is connected; this provides a chamber through which light from lamp 34 may pass so as to make the openings 44 visible in the dark. It will be noticed that the arm 39 has openings 45 which are made visible by light from the lamps 32 and 33. The rows of openings comprising openings 43, 44 and 45 form an L shaped design that can be clearly seen at night. For the purpose of preventing dust from entering the signal when it occupies its inoperative position I have provided a flat spring 46 whose operation is clearly apparent from the drawings.

To operate the signal it is necessary to move the rack 40 up and down in the manner hereinbefore explained. In order that the driver, who is inside of the car, shall be able to move the rack 40 and operate the signal, I have provided the following mechanism. The post 1 is provided with an opening 461 in which is rotatably mounted a telescopic two-part shaft consisting of the tubular members 47 and 48. A handle 49 is secured to the inner end of the shaft; this handle is located within easy reach of the driver. To the outer end of the shaft member 48, I secure an arm 50 that has telescopic connection with the member 51 whose outer end is provided with a slot 52 that embraces the pin 42. Wires 53 and 54 extend through members 50 and 51 in the manner shown. By means of the crank 49 the driver may swing arms 50 and 51 about their pivot, thereby reciprocating the rack 40 and moving the arm 39 from vertical to horizontal position or vice versa.

When the signal is to be employed in connection with an open car, the manner of securing it in place must be altered. In Figs. 8, 9 and 10, I have shown the means employed for securing the signal to the windshield frame 55. This means comprises a clamp 56 which may consist of two identical members held together by means of a clamping bolt 57 which also holds the bracket arm 58. Adjustably secured to the bracket 58 by means of the nut 59 and serrated collar 60 is an upwardly extending bracket 61. This bracket has a lug 62 which receives a portion of the bracket 6 and supports it and the signal. Bracket 61 has another projecting portion 63 through which the shaft 64 passes and in which it is journalled. A handle 65 is connected to one end of shaft 64 and an arm 50 to the other end. The arm 50 and cooperating member 51 are identical with those shown in Figs. 1 and 2 and function in the same manner.

The weight of the rack 40 and associated parts should be sufficient to serve as a counterweight for the arm 39.

I wish to call particular attention to the fact that my signal is so constructed that it forms a capital letter L when it is in operative position and that it has means which outline the same letter by means of rows of luminous openings at night.

Having now described my invention, what I claim as new is:

In an automobile traffic signal having a vertical casing open on one side, a signal arm pivoted to the lower end of the casing and adapted to be folded into the casing when in inoperative position and to extend outwardly in a horizontal direction when in operative position and means for moving said arm from operative to inoperative position, a lamp located within the casing near the upper end thereof, a partition extending transversely of the casing below the lamp, a portion of said partition being immovably secured to the casing and another portion being hingedly connected with the stationary portion so as to normally assume a vertical position and means on the arm for moving the hinged portion to a horizontal position when the arm is moved to inoperative position.

In testimony whereof I affix my signature.

JOSEPH H. POWERS.